United States Patent [19]

Gnage

[11] 3,850,778

[45] Nov. 26, 1974

[54] FILMSTRIP HANDLING DEVICE

[75] Inventor: Oliver W. Gnage, Rochester, N.Y.

[73] Assignee: Eastman Kodak Company, Rochester, N.Y.

[22] Filed: Feb. 27, 1973

[21] Appl. No.: 336,292

[52] U.S. Cl. .................... 156/502, 83/105, 156/159
[51] Int. Cl. ..... B31f 5/00, B65h 69/02, G03d 15/04
[58] Field of Search ........... 156/157, 159, 304, 502, 156/504, 505, 506, 258, 269, 270, 353, 510, 516, 519, 535; 83/782, 509, 609, 102, 105; 242/58.1, 58.4, 58.5

[56] References Cited
UNITED STATES PATENTS

| | | | |
|---|---|---|---|
| 3,461,022 | 8/1969 | Jorgensen | 156/505 |
| 3,607,575 | 9/1971 | Byers et al. | 156/506 |
| 3,647,599 | 3/1972 | Gardner | 156/502 |
| 3,753,834 | 8/1973 | King | 156/506 |
| 3,753,835 | 8/1973 | King | 156/506 |
| 3,779,837 | 12/1973 | Zahn et al. | 156/505 |
| 3,799,826 | 3/1974 | Kron | 156/159 |

*Primary Examiner*—William A. Powell
*Assistant Examiner*—Brian J. Leitten
*Attorney, Agent, or Firm*—T. H. Close

[57] ABSTRACT

In a pre-process film splicing arrangement a novel filmstrip handling apparatus for presenting a filmstrip to a splicing station in accurate orientation to the tail end of a previously spliced filmstrip to insure a secure splice while maintaining integrity of the filmstrip perforation spacing. The handling apparatus accomplishes both accurate positioning and trimming of the lead and tail ends of the filmstrip, and includes a slack take-up arrangement whereby the end trimming steps can be accomplished at proper timed intervals without discontinuing filmstrip movement along its entire length during any particular cutting operation in order to provide high speed operation.

11 Claims, 8 Drawing Figures

FILMSTRIP HANDLING DEVICE

CROSS-REFERENCE TO RELATED APPLICATIONS

Reference is hereby made to commonly-assigned, copending U.S. Patent Application Ser. No. 336,291, now abandoned, entitled "PRE-PROCESS FILM SPLICING SYSTEM," filed in the name of Robert E. Cole on Feb. 27, 1973.

BACKGROUND OF THE INVENTION

1. Field of the Invention

This invention relates to a filmstrip handling apparatus and more particularly to a filmstrip handling apparatus for high speed operation in a pre-process film splicing arrangement.

2. Description of the Prior Art

Due to the rapid increase in popularity of amateur photography the volume of photographic roll film in use has generated the need for large commercial processing laboratories for processing the film in automatic, high speed, continuous processing equipment. In the high speed processing equipment, the exposed film is passed in sequence through a series of operating stations including developing, fixing, washing and drying stations. In order to facilitate the high speed continuous sequence of steps, the individual filmstrips of the various customer orders are joined into a long filmstrip which may be passed in substantially continuous manner through the processing stations. Following processing, the long strip of film must be segmented back into the individual filmstrips of the various customer orders.

The passage of long strips of joined film through the processing equipment (or any other piece of film handling equipment) in a controlled fashion is possible because of the standardized size format of the high volume roll films. In addition to uniform sizes, these films have a series of perforations or sprocket holes along one edge of the film. A series of drive sprockets are located in the printing and cutting equipment to engage the perforations and transport the filmstrip through the equipment prior to sorting for return to the customer. It is therefore essential that the registration of the perforations be maintained both as to spacing and alignment so that the film will not be mechanically damaged or cause jam-ups in the printing and cutting equipment.

Until recently, the splicing of individual customer order rolls of film was accomplished in an inefficient and time consuming substantially manual operation. However, the aforementioned commonly-assigned copending U.S. Patent Application Ser. No. 336,291, now abandoned, to Cole describes a substantially fully automatic pre-process film splicing arrangement for joining individual customer orders of exposed photographic filmstrips to form a long strip of film suitable for high speed processing. In this arrangement, after the individual filmstrips of the various customer orders are placed in a dispenser in white light in a precise order, the dispenser is attached to an automatic splicing apparatus and, in the dark, each filmstrip is in turn removed from its container and fed through a suitable filmstrip guide to the handling apparatus of this invention to control the movement and positioning of the filmstrip as it passes through the automatic splicing apparatus.

SUMMARY OF THE INVENTION

It is an object of this invention to provide a filmstrip handling apparatus for controlling the movement and positioning of filmstrips to be spliced together according to the above-described automatic splicing arrangement.

It is further an object of this invention to provide a filmstrip handling apparatus which accurately and automatically trims both the lead and tail ends of the filmstrip being handled.

It is another object of this invention to provide a filmstrip handling apparatus having high speed operational capability due to the inclusion of a slack take-up arrangement whereby the cutting of the ends of the filmstrip may be accomplished at proper timed intervals without discontinuing the filmstrip movement along its entire length during any particular cutting operation.

Accordingly there is herein provided a filmstrip handling apparatus having a track portion for establishing the positioning of the filmstrip so as not to damage the surfaces thereof as the filmstrip is driven through the various stations in the splicing arrangement. The track portion has an entrance section and an exit section, each section having drive rollers associated therewith, and a mid-section located between the entrance and exit sections. A splice station is formed at the junction of the mid-section and the exit section. Air actuated registry pins particularly located in the entrance section, the mid-section and the exit section selectively engage the filmstrip perforations to stop and accurately position the filmstrip in each station while insuring the integrity of the filmstrip perforation spacing. The mid-section is pivotally connected to the entrance section for movement between a lowered position and a raised position so that when the mid-section is in its lowered position the filmstrip will be directed beneath the splice station; and as it moves to its raised position, the lead end of the film will be trimmed as it is presented to the splicing station. The mid-section has a trap door which is pivotally connected thereto so as to selectively permit the filmstrip to be directed into a slack box located beneath the mid-section in order that the overall filmstrip movement may continue while the lead and tail ends are being independently prepared, in order that high speed operation can be accomplished.

Description of the Preferred Embodiments

Figure 1:
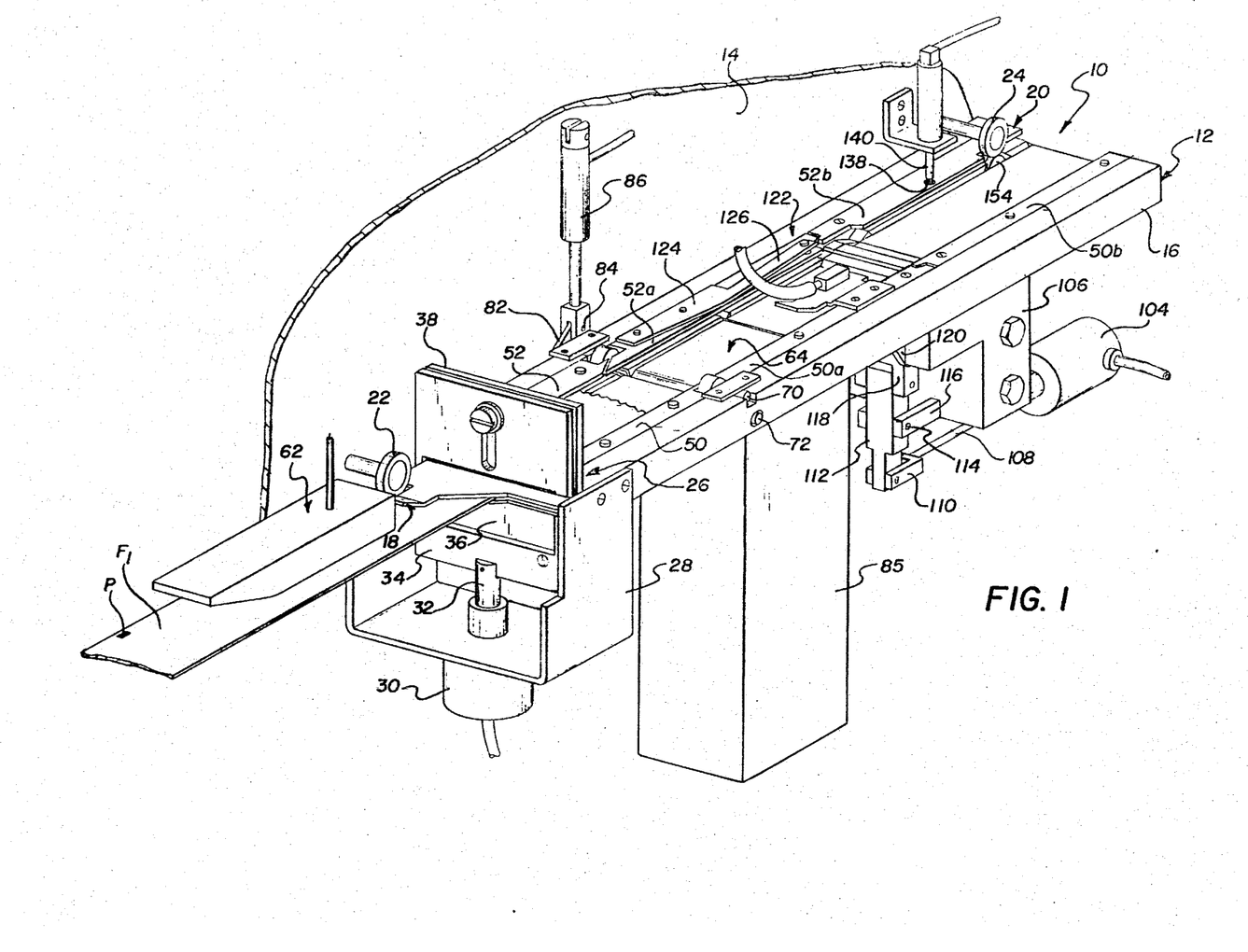
FIG. 1 is a perspective view of the filmstrip handling apparatus according to this invention.

Referring now to the drawings, FIG. 1 shows a filmstrip handling apparatus 10 having a track portion 12 mounted on the frame 14 of the film splicing arrangement as described in the aforementioned U.S. Patent Application Ser. No. 336,291, now abandoned. The track portion 12 has a base 16 which extends between a filmstrip entrance section 18 and a spliced-film exit section 20. Associated with the entrance section 18 and the spliced-film exit section 20 respectively are drive rollers 22 and 24 which serve to drive a filmstrip to be spliced into the track portion 12 and to drive the spliced filmstrips onto a take-up system (not shown) to form a long filmstrip suitable for high speed processing.

The filmstrip entrance section 18 of the track portion 12 includes a tail-end cutter 26. The tail-end cutter 26 in turn includes a support channel 28 affixed to the base 16, the channel 28 supporting an air cylinder 30. The air cylinder 30 controls a reciprocating shaft 32 upon which is mounted a knife holder 34, which in turn supports a knife blade 36 for cutting the film in the track portion 12. Above the base 16 is an upper knife and guide 38 which serves to guide the knife holder 34 in its vertical travel to accomplish accurate cutting of the film at the proper desired location.

Figure 4:
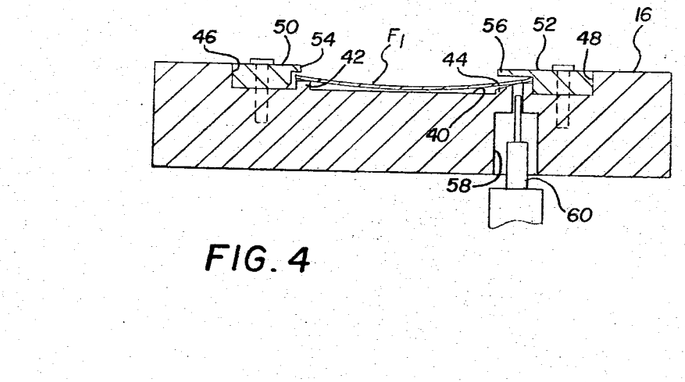
FIG. 4 is a cross-sectional view of the filmstrip handling track taken along the lines 4—4 of FIG. 2.

Adjacent the upper knife and guide 38, the track 12 is configured as shown in FIG. 4 for the purpose of preventing damage to the image areas of the filmstrip to be spliced. The base 16 has a channel portion 40 along the upper surface thereof with ribs 42 and 44 extending from the bottom of the channel 40 vertically upward less than the full height of the channel. Between the ribs 42 and 44 and the vertical walls 46 and 48 of the channel 40, are located filmstrip guides 50 and 52 respectively having lips 54 and 56 which at least in part overlie the ribs 42 and 44. The natural curvature of the filmstrip F1 as it passes between the guides 50 and 52 results in an orientation of the filmstrip F1 so that the film will be supported only between the ribs 42 and 44 and lips 54 and 56. In this manner only the edge portions of the film are touched and the emulsion surface is free from any possible damaging contact with the remaining track elements.

Figures 2, 2A:
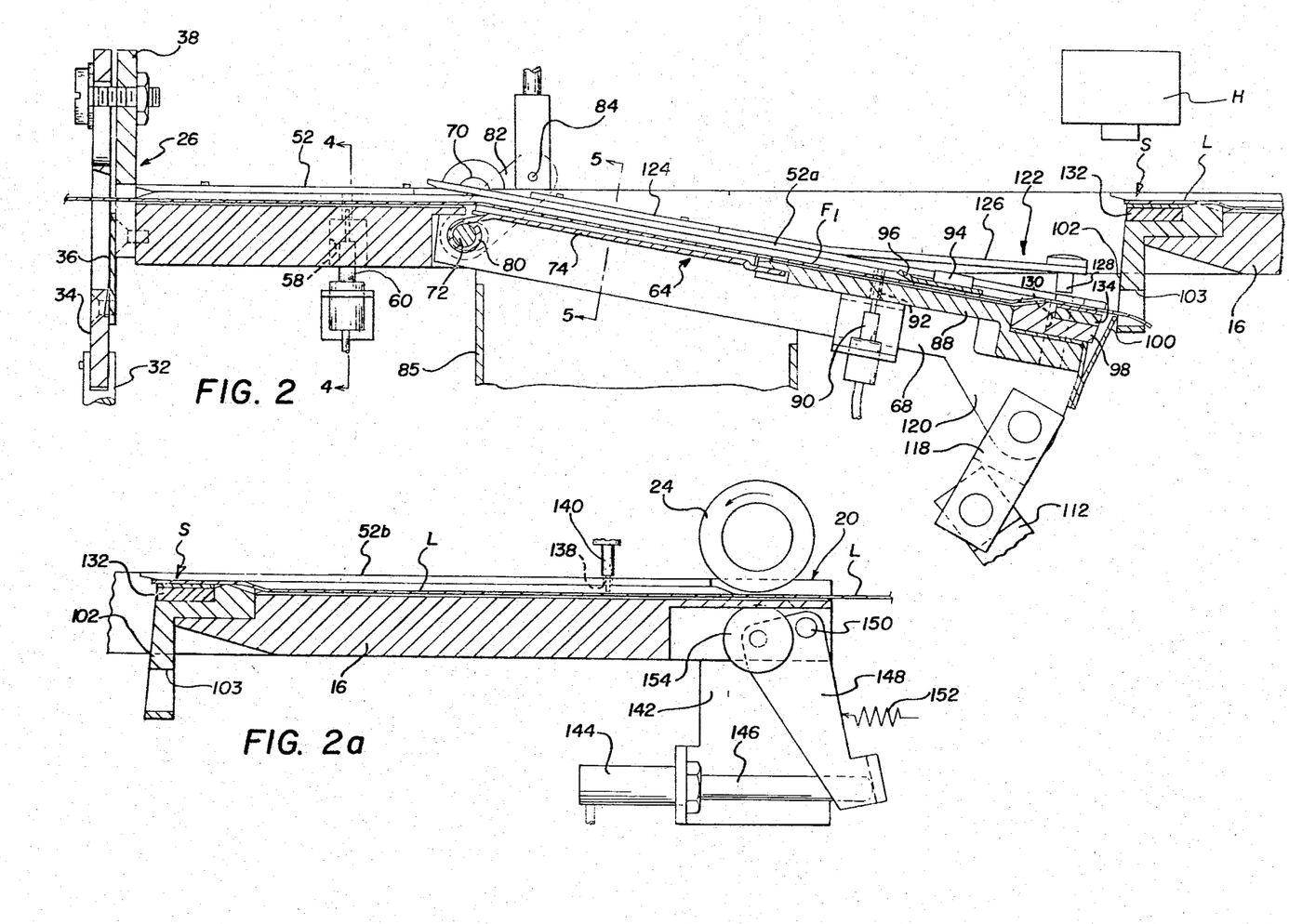
FIGS. 2 and 2a are side elevational views of the filmstrip handling track showing the mid-section in its down position.
Figure 6:
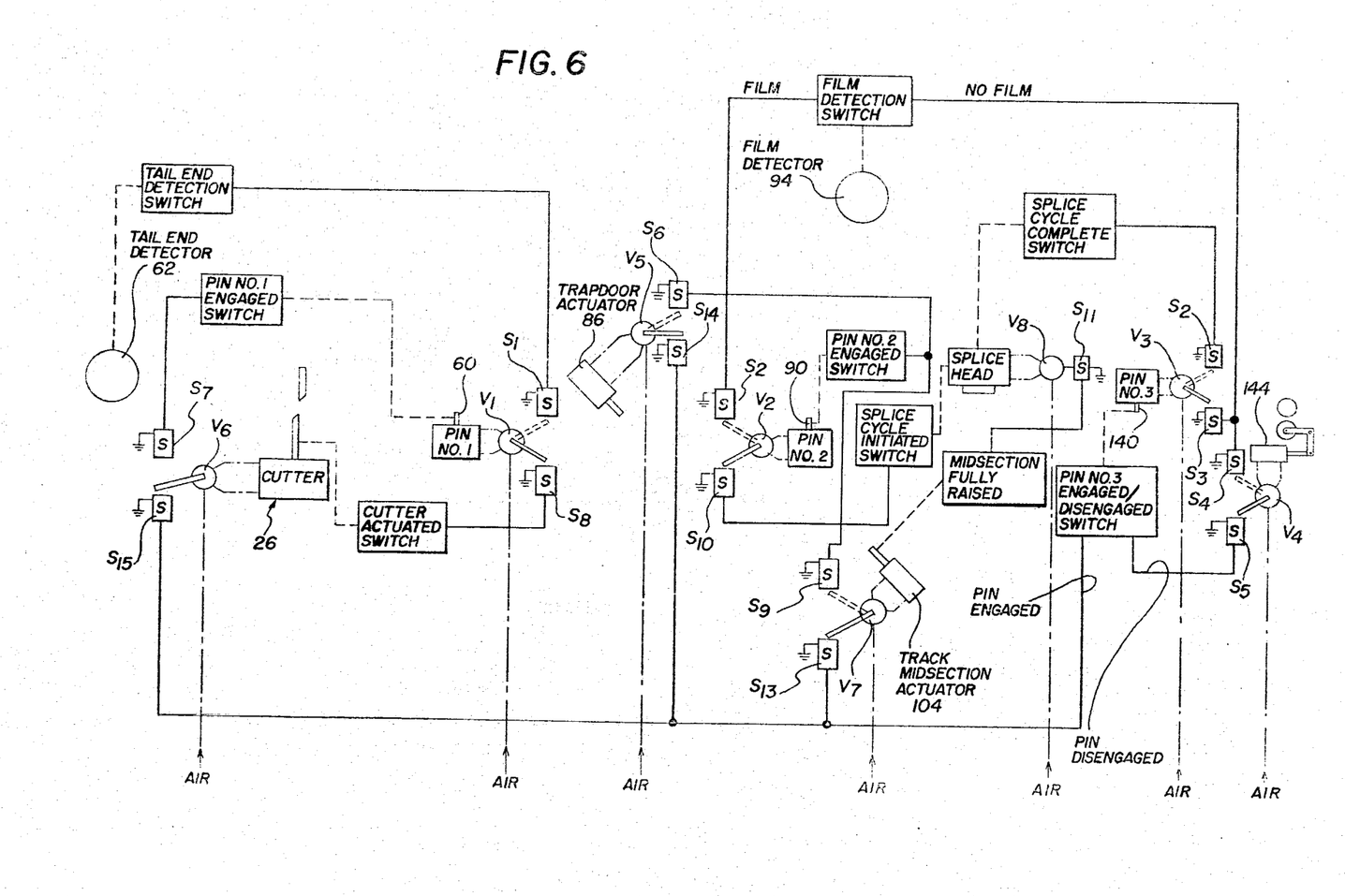
FIG. 6 is a schematic diagram of the control arrangement for the filmstrip handling apparatus according to this invention.

The base 16 has a bore 58 located beneath the projection 44 and extending upwardly therethrough. Located directly beneath the bore 58 is an air actuated registry pin 60 (see FIGS. 2 and 4). The location of the pin 60 is such that when it is selectively extended into the opening between the lip 56 and the projection 44 it will engage a perforation P of the filmstrip F1 when it is desired to stop the filmstrip for the purpose of cutting the tail-end thereof. The selective actuation of the registry pin 60 to engage the film perforation is accomplished by means of a signal from a film guiding device, such as that shown in representative form as the tapered guide 62 (see FIG. 1). As schematically shown in FIG. 6 and more fully described hereinbelow, a signal from the guide 62 will actuate a solenoid $S_1$ to position a pneumatic valve $V_1$ to extend the pin 60 into engagement with the filmstrip perforation.

Figure 3:
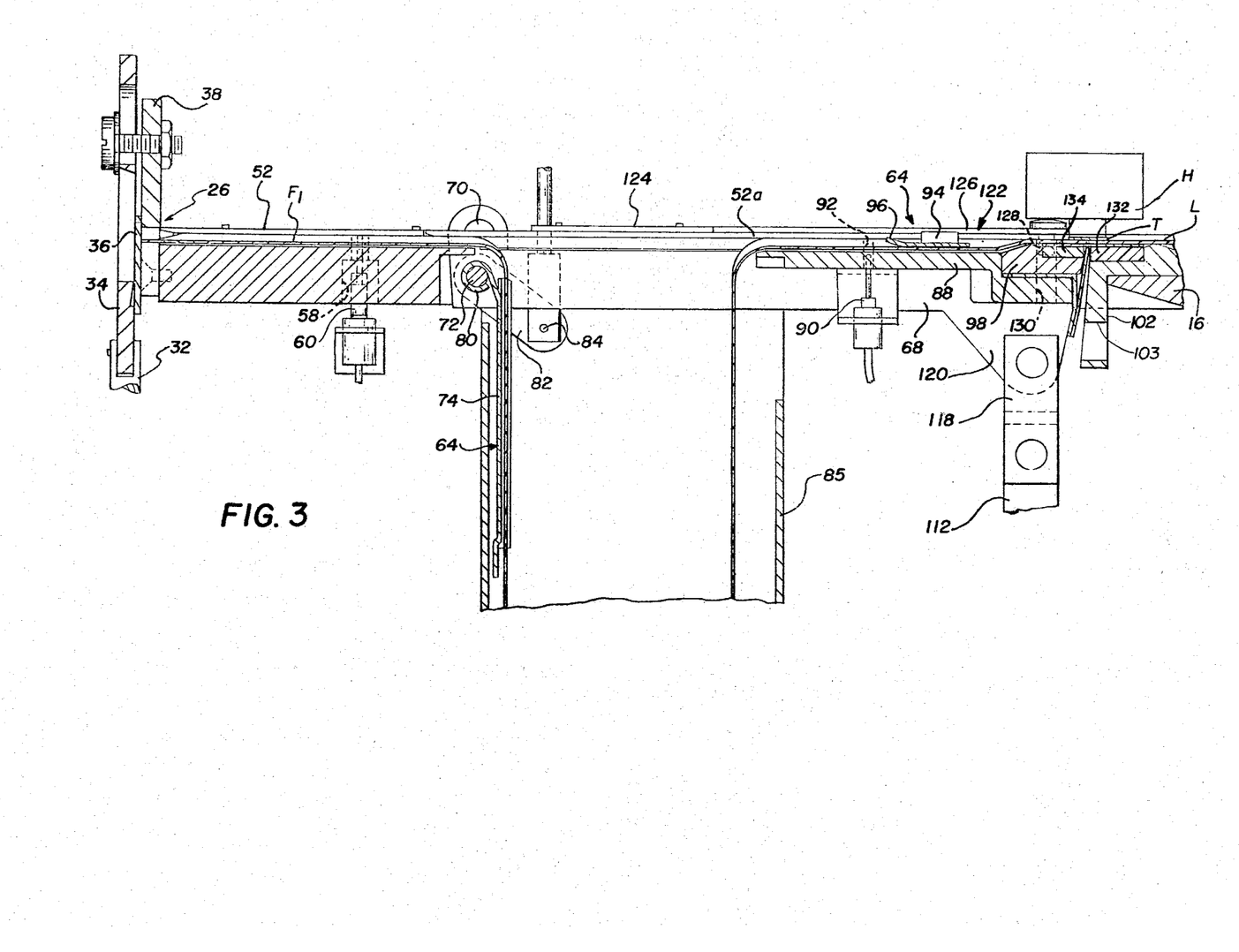
FIGS. 3 and 3a are side elevational views of the filmstrip handling track similar to that shown in FIGS. 2 and 2a with the mid-section in its raised position and the slack take-up trap door in its down position.
Figure 5:
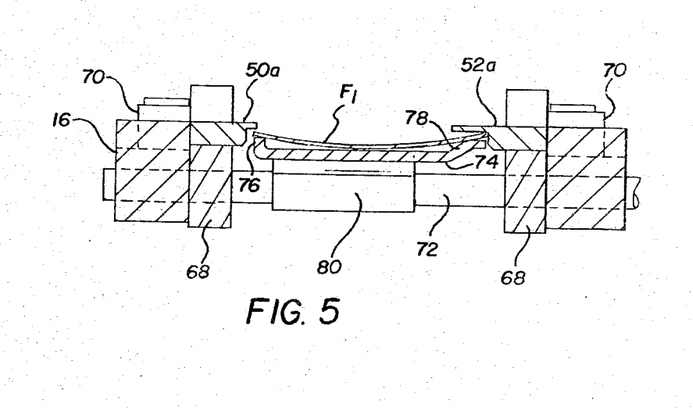
FIG. 5 is a cross-sectional view of the mid-section taken along the lines 5—5 of FIG. 2.

Between the entrance section 18 and the exit section 20 of the filmstrip handling apparatus 10 is a mid-section 64 having longitudinal support members 68 (see FIGS. 2,3) which are pivotally mounted to the base 16 by pivot pins 70. Pivotally mounted on the support members 68 by pivot pin 72 is a slack take-up trapdoor 74. The trapdoor 74 is generally trough shaped with upstanding edge portions 76 and 78 (see FIG. 5) which cooperate with filmstrip guides 50a and 52a to provide a guiding support for the filmstrip F1 so that the image areas of the film do not touch the surface of the trapdoor 74. Extending downwardly from the trapdoor 74 is a transverse sleeve 80 which is fixed to the pivot pin 72 so as to support the trapdoor 74 for movement with the pivot pin 72. An arm 82 is connected at one end to the pivot pin 72 and at the other end to a pivot pin 84 fixed to an air cylinder 86 for selective movement of the arm 82 to control the trapdoor 74. The trapdoor 74 overlies a slack box 85 in which film accumulation may occur when the forward end of a filmstrip has been stopped for accomplishing the splicing operation and the tail-end of the filmstrip is still moving, as will be described hereinbelow.

Between the ends of the longitudinal supports 68 (opposite the pivotally supported ends) there is a transverse support member 88 to which is connected an air actuated registry pin 90. The registry pin 90 is located so as to pass through a bore 92 in the support 88 such that the pin 90 will engage a perforation fo the filmstrip F1 to stop the filmstrip in proper of for lead-end cutting. The signal to actuate the registry pin means 90 is derived by a sensor 94 (of any suitable type such as air or infrared) which detects the lead end of the filmstrip F1 as it passes beneath the sensor and sends a signal to a solenoid $S_2$ to position a pneumatic valve $V_2$ to extend the pin 90 to engage a film perforation P (see FIG. 6) in a manner to be explained hereinbelow. The sensor 94 is mounted on a support 96 which in turn is fixed to the filmstrip guide 50a. Also mounted on the transverse support member 88 is a lead-end guide segment 98 which guides the lead end of the film into position for trimming prior to splicing. The member 88 further supports a knife blade 100 which cooperates with a fixed knife 102 supported by the base 16 beneath the portion of the splice station S formed by the exit section 20. The lead end of the film extends through the knife 102 and, as the mid-section is moved to its raised position (FIG. 3) in the manner explained hereinbelow, the lead end will be trimmed by the interaction of the blade 100 and the cutting blade 103 of the knife 102.

Movement of the longitudinal supports 68 about the pivot pins 70 is accomplished by means of an air cylinder 104 which is connected to the base 16 by a support 106. The air cylinder 104 selectively reciprocates a shaft 108 which is pivotally connected through a pin 110 to a lever 112. The lever 112 pivots about the pivot pin 114 mounted on the pivot support 116 and is connected at its other end to a link 118 which depends from flanges 120 extending from the forward end of the longitudinal supports 68 of the mid-section 64. Reciprocation of the shaft 108 by air cylinders 104 will therefore cause pivoting of the lens 112 about pivot pin 114 to raise or lower link 118 to correspondingly move the mid-section 64 to a raised or lowered position for the purpose to be explained hereinbelow.

In order to insure that a perforation is present in the finished spliced filmstrip in the area in which a splice occurs, a perforator 122 is provided. The perforator 122 is comprised of an elongated arm fixed at one end 124 to the filmstrip guide 52a and having the other end 126 bent outwardly away from the filmstrap guide 52a, with the end 126 being connected to the end 124 in such a manner that there is a residual spring force in the end 126 which attempts to maintain it spaced from the guide 52a. The end 126 carries a punch 128 which upon depression thereof will pass through an opening 130 (FIG. 2) in the filmstrip guide 52a. The location of the punch 128 is selected so as to accomplish the formation of a perforation in the film F1 in the area of the splice, the perforation being accurately spaced from and aligned with the other film perforations.

In the area of splice station S formed by the exit section 20, there is located an appropriate support 132 which along with a similar support 134 in the lead-end guide segment 98 of the mid-section 64 (when the mid-section 64 is in its raised position) forms a base upon which a heat seal splice may be accomplished by the splicer H (the construction of which forms no part of this invention). The support 132 is carried by the base 16 which also serves to support the filmstrip guides 50b and 52b. It is noted that the abutments of the ends of the filmstrip guides 50, 50a and 5b and 52, 52a and 52b are at an angle with respect to the longitudinal axis of the track portion 12. In this manner, when the filmstrip is progressing down the track 12 in the filmstrip guides, the edge of the film will never be exposed to a sharp transverse edge which might bind the film and cause jamming in the filmstrip handling apparatus 10.

Adjacent the splice station S, in the filmstrip guide 52b of the exit section 20, there is a bore 138 through which extends an air actuated registry pin 140 similar to the registry pins 60 and 90. The pin 140 is located so as to engage a perforation of the filmstrip to stop the filmstrip in proper position for splicing to the next succeeding filmstrip. The signal to actuate the registry pin 140 is received from the sensor 94 when the sensor detects that the tail-end of a spliced filmstrip has passed beneath the sensor (no film condition). The signal will be transmitted to a solenoid $S_3$ to position a pneumatic valve $V_3$ to extend the pin 140. The registry pin 140 will pass through the bore 138 to engage the next succeeding filmstrip perforation which passes therebeneath to stop the filmstrip and accurately position the tail end in the splice station S for subsequent splicing operations.

Figure 3A:
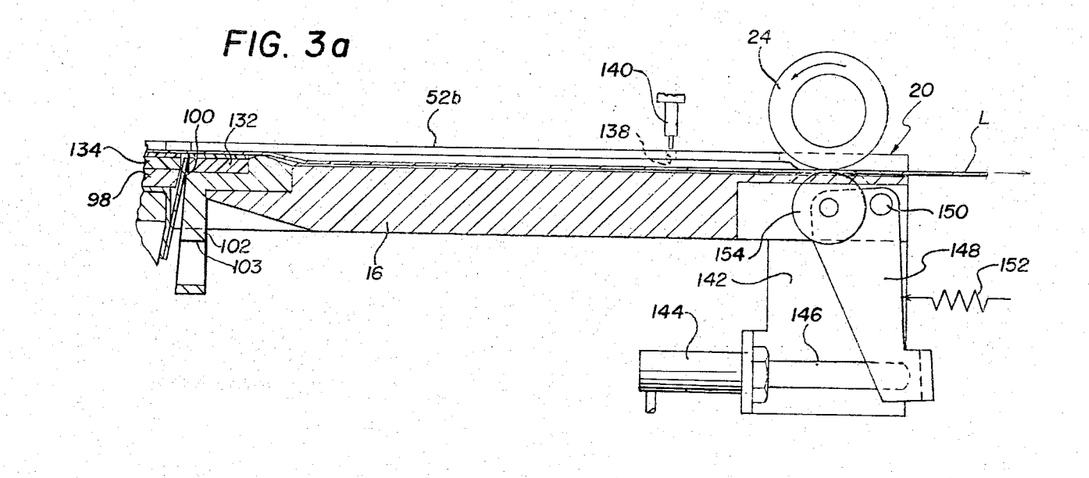

At the end of the exit section 20, there is a support 142 dependent from the base 16. The support 142 serves to provide a mount for air cylinder 144 which controls the operative engagement of the spliced film exit drive roll 24 with the film to be wound on a take-up mechanism (not shown, and forming no part of this invention). The air cylinder 144 has a selectively reciprocable shaft 146 which engages a crank 148 to urge the crank 148 in a counterclockwise direction about the pivot 150 against the bias of a biasing means shown schematically as numeral 152. A pressure roller 154 is rotatably mounted on the crank 148 such that when the shaft 146 is retracted to permit the biasing means 152 to move the crank 148 clockwise (see FIG. 3a), the pressure roller 154 will contact the film to force the film against the drive roller 24 to accomplish positive take-up thereof. Engagement of the shaft 146 with the crank 148 is dependent upon the actuation of registry pin means 140; i.e., when the pin 140 is actuated to an engaged position, air cylinder 144 must be actuated to insure that the filmstrip will not be simultaneously subjected to driving and stopping forces. To accomplish actuation of the air cylinder 144, a solenoid $S_4$ is adapted to receive a signal from the sensor 94 substantially simultaneously with the signal to $S_3$ to initiate engagement of the pin 140. The solenoid $S_4$ will position a pneumatic valve $V_4$ to extend the shaft 146 of the air cylinder 144. To retract the shaft 146, a solenoid $S_5$ will position the pneumatic valve $V_4$ to accomplish retraction. The solenoid $S_5$ is activated by a signal generated when the pin 140 is disengaged from the filmstrip (see FIG. 6).

With the structure thus hereinabove described, the operation of the filmstrip handling device 10 is as follows: The leader L (or tail end of the previously spliced filmstrip) is accurately positioned in the area of the splice station S located in the exit section 20 by the engagement of the pin means 140 with a perforation of the leader L. Because no film is detected by the sensor 94, the solenoids $S_3$ and $S_4$ will be activated to engage pin 140 with a perforation of the leader L and to extend the shaft 146 of air cylinder 144 to rotate the crank 148 counterclockwise about the pivot 150 to disengage the pressure roller 154 from the drive roller 24 so that the leader L is not being positively driven onto the film take-up (not shown).

With the leader L thus positioned, a first filmstrip F1 will be guided through the guiding device 62 to enter the entrance section 18 of the filmstrip handling apparatus 10. At the time that filmstrip F1 enters the entrance section 18, the mid-section will be located in its lowered position (see FIG. 2), having been so positioned by the air cylinder 104 in the manner described above. After passing through the entrance end 18, the filmstrip F1 is driven through the track portion 12 by means of the drive roller 22. The filmstrip F1, as noted above, is supported between the projections 42 and 44 and the lips 54 and 56 of the filmstrip guides 50 and 52 as it passes through the entrance section 18, and then is supported by means of the up-standing edge portions 76 and 78 of the trapdoor 74 in cooperation with the filmstrip guides 50a and 52a in the mid-section 64. As the leading edge of the filmstrip F1 is detected by the sensor 94, a signal is sent to the solenoid $S_2$ to activate valve $V_2$ to extend the pin 90 to engage the film and intercept the next succeeding filmstrip perforation. As the registry pin 90 is inserted into the perforation the filmstrip will be stopped such that the lead end extends beyond the lead-end guide 98 and through the knife 102 in order that the lead end may be in position to be trimmed by the cooperating knife blades 100 and 103 for presentation to the splice station S.

As the registry pin 90 engages the perforation of the filmstrip F1 to stop the filmstrip, a signal will be sent to solenoid $S_6$ to position pneumatic valve $V_6$ to actuate the air cylinder to rotate the arm 82 and pivot pin 72 so that the sleeve 80 will be rotated clockwise to open the trapdoor 74 and permit the filmstrip F1 (which is still being driven by the drive roller 22) to accumulate in slack box 85. Accumulation of the film in the slack box 85 will continue until the tail end of the filmstrip F1 is sensed by the guiding device 62 and the appropriate signal is sent to the solenoid $S_1$ to actuate the registry pin 60 to engage the next succeeding perforation of the filmstrip F1 and stop the tail end of the film in proper position in the tail-end cutter 26. Engagement of the pin 60 will send a signal to a solenoid $S_7$ to position the pneumatic valve $V_6$ to actuate the tail-end cutter 26 by energizing the air cylinder 30 to reciprocate the shaft 32 upwardly so that the knife blade 36 within the holder 34 will properly cut the tail end of the filmstrip in order that it may be later accurately located in the splice station S for forming the next subsequent splice, with perforation integrity being maintained.

After the cutting operation has been initiated, a signal will be sent to solenoid $S_8$ to reposition valve $V_1$ to cause the pin 60 to be retracted so that the filmstrip F1 can be advanced at the proper time.

Turning now to the operation of the mid-section 64, when the registry pin 90 has stopped the filmstrip F1 in proper position in the lead-end guide segment 98 of the mid-section 64, the air cylinder 104 will be actuated by the signal to the solenoid $S_9$ which positions the pneumatic valve $V_7$ to rotate the lever 112 to move the mid-section 64 to its raised position. As the mid-section 64 is being moved to its raised position, the lead end of the filmstrip will be trimmed by the cooperative action of the knife blades 100 and 103 which properly cut the film to the exact desired length relative to the perforation engaged by the pin 90. The distance between the pin 90 and the pin 140 is such that accurate film perforation spacing will be maintained. When the mid-section has reached its fully raised position, the trimmed end of the filmstrip and the properly positioned leader L will be accurately associated in the splice station S. A signal will then be sent to the solenoid $S_{11}$ to position the pneumatic valve $V_8$ to permit the conventional heat sealing splicing head H (see FIG. 3) to be cycled to come down and engage a piece of splicing tape T dispensed so as to overlie the particularly positioned film ends to form the splice between the film ends. When the cycle of the splicing head H is initiated, a signal will be transmitted to the solenoid $S_{10}$ to position the valve $V_2$ so that the pin 90 will be returned to its retracted position. The head H is so configured that as it comes down to form the splice it will also depress the punch 128 of the perforator 122 to form a perforation in the splice area so as to maintain the integrity of the film perforations to permit the proper drive action through the processing equipment.

When the splice has been accomplished, the head H is retracted and the perforating punch 128 will be biased upwardly to its initial position by the spring action of the end 126 of the perforator 122 to remove the punch from the formed perforation. Substantially simultaneously, a signal will be sent to the solenoid $S_{12}$ to position the valve $V_3$ so that the registry pin means 140 will be removed from the perforation in the filmstrip leader L. Retraction of the pin 140 initiates a signal to activate solenoid $S_5$ and position valve $V_4$ to engage the pressure roller 154 with the film to create the exit drive force on the film by means of the exit drive roller 24 as explained hereinabove. The spliced film will therefore be withdrawn and fed to a take-up roll (not shown) to form the long filmstrip suitable for high speed processing. As the film is being withdrawn, the slack in the slack box 85 will be taken up. When the end of the filmstrip F1 is detected by the sensor 94, a signal will be sent to the solenoid $S_3$ to position the valve $V_3$ so that registry pin 140 will engage the next succeeding perforation in the tail end of the filmstrip F1 so that the tail end thereof will be accurately positioned in the splice station S and to the solenoid $S_4$ to position valve $V_4$ to release the pressure roller 154.

Upon the engagement of the pin 140 with the film perforation, a signal will be sent to a solenoid $S_{13}$ to position the valve $V_7$ to actuate the air cylinder 104 to retract the shaft 108 to return the mid-section 64 to its down position preparatory to receiving the next filmstrip to be spliced into the continuous long strip. At the same time a signal is sent to a solenoid $S_{14}$ to position valve $V_5$ to actuate air cylinder 86 to close the slack take-up trapdoor 74. Further, a signal is sent to a solenoid $S_{15}$ to position the valve $V_6$ to retract the cutter 26.

The entire above sequence will of course be repeated until the desired length of filmstrip is obtained for economic high speed processing.

From the foregoing it can be seen that there is herein provided a novel filmstrip handling device for presenting filmstrips to a splicing station in accurate orientation to form splices necessary to join individual filmstrips into a long filmstrip for economic high speed processing. The handling device provides means for accurately positioning and trimming both the lead end and tail end of a filmstrip and further includes a slack take-up arrangement whereby the end cutting steps can be accomplished at the proper timed intervals without discontinuing filmstrip movement along its entire length during any particular cutting operation in order to provide a high speed operation.

The invention has been described in detail with reference to a preferred embodiment thereof, but it will be understood that variations and modifications can be effected within the spirit and scope of the invention.

I claim:

1. In an apparatus for successively moving a series of strips to and past a splicing station wherein the lead end of each strip is adapted to be spliced to the tail end of a preceding strip, a guideway for guiding said strips during such movement comprising:

a base;

a segmented guide track supported by said base, said guide track having, in order, an entrance section, a mid-section, and an exit section, the junction between said mid-section and said exit section being located at said splice station;

said entrance section having drive means for selectively advancing successive strips along said segmented track to said splice station;

said mid-section being selectively pivotable about an axis between a first position out of alignment with said exit section and a second position in alignment therewith, said axis being located perpendicular to the forward direction of travel of said strip in said entrance section to maintain the continuity of the travel path of said strip between said entrance section and said mid-section;

means for pivoting said mid-section about said axis; and means operable as said mid-section is pivoted from said first position to said second position for trimming the lead end of a strip in said mid-section to prepare said lead end for splicing in said splice station.

2. The apparatus of claim 1 wherein said trimming means includes cooperating cutter blades on said mid-section and said exit section.

3. The apparatus of claim 1, wherein said mid-section is supported from said base by a pivot means adjacent that end of said mid-section nearest said entrance section and is swingable about said pivot means between said first and second positions so as to always maintain a travel path between said entrance section and said mid-section.

4. The apparatus of claim 1, the strip being of the type having regularly spaced perforations along one edge thereof, and said apparatus further comprising means associated with said entrance section for trimming the tail end of a strip in predetermined relation to its perforations; and  means responsive to the approach of a trimmed tail end of a strip to said splicing station for accurately locating said trimmed tail end in proper position in said splicing station for splicing therein to the next succeeding strip.

5. The apparatus of claim 1, wherein said mid-section further includes slack take-up means ahead of said splice station to provide for accumulation of at least a portion of a strip while the lead end of said strip is in said splice station.

6. The apparatus of claim 5, wherein said slack take-up means includes a trap door carried by said guide track mid-section, a slack box located beneath said trap door, and an actuating means operable to selectively open said trap door to provide for accumulation of said strip portion in said slack box.

7. The apparatus of claim 1, wherein said trimming means includes sensing means associated with said mid-section for detecting the presence of a strip therein, and means responsive to said sensing means for locating the lead end of said strip in a predetermined position relative to said mid-section.

8. The apparatus of claim 7, wherein said pivoting means is responsive to actuation of said locating means.

9. The apparatus of claim 7, the strips being of the type having regularly spaced perforations along one edge thereof, and wherein said locating means includes a registry pin movably mounted on said mid-section and adapted to be selectively movable to intersect said guide track to engage one of said perforations, and means responsive to said sensing means for actuating said registry pin.

10. The apparatus of claim 7 further comprising means responsive to said sensing means for locating the tail end of a strip in proper position in said splicing station for splicing to the lead end of the next succeeding strip.

11. The apparatus of claim 7 further comprising slack take-up means responsive to actuation of said locating means for accumulation of the trailing portion of said strip while the lead end is located in said predetermined position.

* * * * *